United States Patent
Miyazaki

(10) Patent No.: US 8,339,013 B2
(45) Date of Patent: Dec. 25, 2012

(54) SEMICONDUCTOR DEVICE AND METHOD OF CONTROLLING ELECTROSTATIC ACTUATOR

(75) Inventor: Takayuki Miyazaki, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 997 days.

(21) Appl. No.: 12/270,400

(22) Filed: Nov. 13, 2008

(65) Prior Publication Data

US 2009/0121662 A1    May 14, 2009

(30) Foreign Application Priority Data

Nov. 14, 2007   (JP) ................................. 2007-295209

(51) Int. Cl.
*H02N 1/00* (2006.01)
(52) U.S. Cl. ......................................... 310/309; 200/181
(58) Field of Classification Search .................. 310/309; 367/271; 200/181
See application file for complete search history.

(56) References Cited

U.S. PATENT DOCUMENTS

| 5,578,976 | A | 11/1996 | Yao | |
|---|---|---|---|---|
| 7,751,173 | B2 * | 7/2010 | Ikehashi et al. | 361/271 |
| 7,795,778 | B2 * | 9/2010 | Ikehashi | 310/309 |
| 7,885,051 | B2 * | 2/2011 | Ikehashi et al. | 361/271 |
| 8,044,552 | B2 * | 10/2011 | Ikehashi | 310/309 |
| 2006/0056128 | A1 * | 3/2006 | Cranford et al. | 361/207 |
| 2007/0139145 | A1 * | 6/2007 | Subramanian et al. | 335/78 |
| 2007/0181411 | A1 * | 8/2007 | Ikehashi et al. | 200/181 |
| 2008/0091961 | A1 * | 4/2008 | Cranford et al. | 713/300 |
| 2009/0284892 | A1 * | 11/2009 | Miyano | 361/211 |
| 2010/0238600 | A1 * | 9/2010 | Miyazaki | 361/211 |

FOREIGN PATENT DOCUMENTS

| JP | 2007-242607 | 9/2007 |
|---|---|---|
| JP | 2008-67549 | 3/2008 |

OTHER PUBLICATIONS

Tamio Ikehashi, et al. "An RF MEMS Variable Capacitor with Intelligent Bipolar Actuation", IEEE International Solid-State Circuits Conference, 2008, pp. 482-283.
G. M. Rebeiz, "RF MEMS Theory, Design, and Technologies." Wiley-Interscience, pp. 190-191.
Japanese Office Action issued Mar. 13, 2012, in Japan Patent Application No. 2007-295209 (with English translation).

* cited by examiner

*Primary Examiner* — Karl Tamai
(74) *Attorney, Agent, or Firm* — Oblon, Spivak, McClelland, Maier & Neustadt, L.L.P.

(57) ABSTRACT

A semiconductor device controls an electrostatic actuator having first and second electrodes formed so as to come close to each other when transition occurs from opened state to closed state by electrostatic attraction against elastic force. The semiconductor device includes: a voltage generation unit generating different applied voltages to be applied to the first and second electrodes; a control unit controlling the voltage generation unit to switch the applied voltages; and a detection unit detecting voltage of the first or second electrode or a rate of change in the voltage. The control unit controls a target voltage of the voltage generation unit to be switched from a first voltage to a second voltage lower than the first voltage according to a detection output by the detection unit.

8 Claims, 10 Drawing Sheets

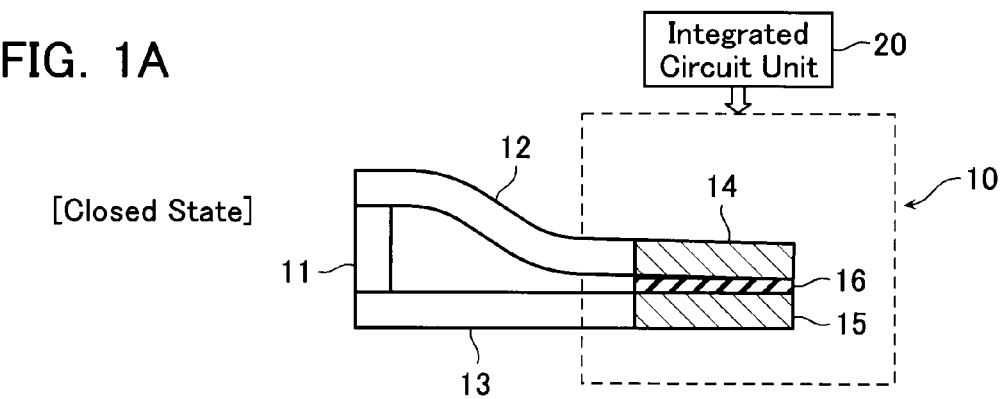
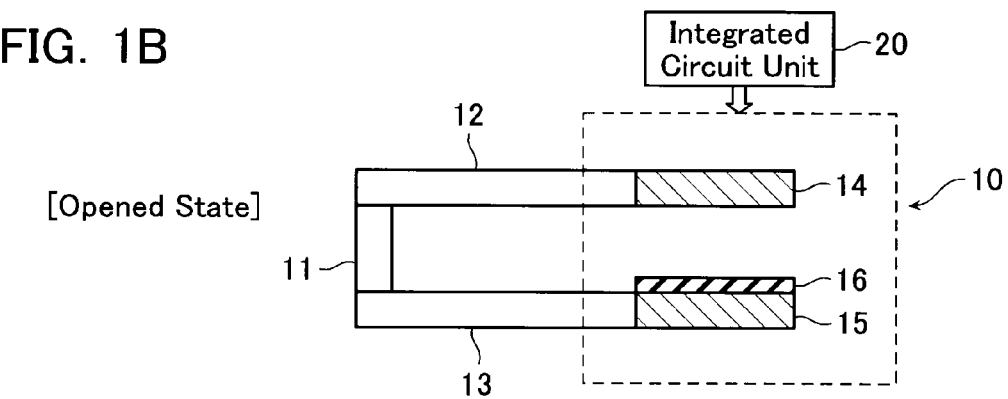
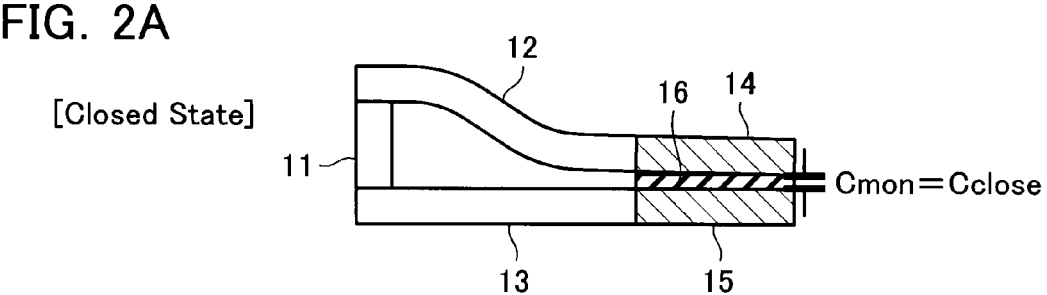
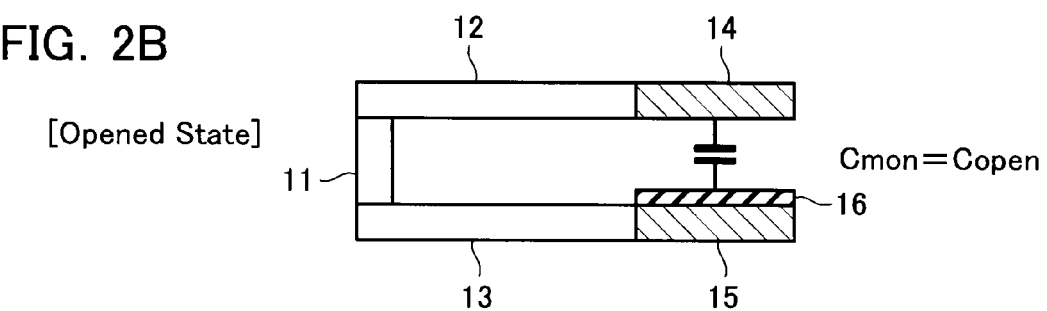

SEMICONDUCTOR DEVICE AND METHOD OF CONTROLLING ELECTROSTATIC ACTUATOR

CROSS-REFERENCE TO RELATED APPLICATIONS

The present disclosure relates to subject matters contained in Japanese Patent Application No. 2007-295209 filed on Nov. 14, 2007, which are expressly incorporated herein by reference in its entireties.

BACKGROUND OF THE INVENTION

1. Field of the Invention

The present invention relates to a semiconductor device controlling an electrostatic actuator with MEMS (Micro Electro Mechanical Systems) and a method of controlling the electrostatic actuator.

2. Description of the Prior Art

Recently, MEMS has attracted increasing attention as a technology for achieving small, lightweight, low power consumption, and high-performance electronics. The MEMS is a system where minute mechanical elements and electronic circuit elements are integrated using silicon process technology.

An example structure of electrostatic type actuators using MEMS technology has been disclosed in Patent Document 1 (U.S. Pat. No. 5,578,976). In order to bring an electrostatic actuator into a closed state (where the upper electrode and the lower electrode come in contact with each other via an insulating film), a potential difference is applied between the upper electrode and the lower electrode so that such electrostatic attraction is provided between the electrodes that is greater than the elastic force of a movable unit to which the upper electrode is fixed.

As can be seen, for the electrostatic actuator in its closed state, the upper electrode and the lower electrode come in contact with each other via the insulating film and a larger capacitance is provided there between than in the opened state. At this moment, charges can be injected and trapped into the insulating film using an FN (Fowler-Nordheim) tunnel or a Poole-Frenkel mechanism. This phenomenon is expressed as dielectric charging in electrostatic type actuators.

When the amount of charges trapped into the insulating film due to the dielectric charging becomes larger than a certain value, the upper electrode is attracted toward the charges in the insulating film even if the potential difference between the upper electrode and the lower electrode is set to 0V. Accordingly, the electrostatic actuator cannot be changed from its closed state to opened state. This phenomenon is expressed as stiction due to dielectric charging.

One of means for avoiding such stiction has been described in, e.g., Non-Patent Document 1 (G. M. Rebeiz, "RF MEMS Theory, Design, and Technology," Wiley-Interscience, 2003, pp. 190-191). It is difficult, however, to eliminate charges trapped into the insulating film and completely exclude stiction. While a predetermined voltage is generally applied between the upper electrode and the lower electrode for a predetermined period of time to bring the electrostatic actuator into its closed state, it is necessary to apply sufficiently high voltage for accommodating manufacturing variations of the electrostatic actuator.

In addition, it is also necessary to apply voltage for a sufficiently long period of time. The higher the applied voltage and the longer the time applied voltage becomes, the more rapid growth will be provided in the dielectric charging. Therefore, there is a need for a semiconductor device that may apply only a minimum voltage to an electrostatic actuator for a minimum period of time that is necessary for the electrostatic actuator to transition to its closed state, thereby achieving reduced power consumption, increased operating speed, and improved reliability.

SUMMARY OF THE INVENTION

One aspect of the present invention provides a semiconductor device controlling an electrostatic actuator having first and second electrodes formed so as to come close to each other when transition occurs from opened state to closed state by electrostatic attraction against elastic force, the semiconductor device comprising: a voltage generation unit generating different applied voltages to be applied to the first and second electrodes; a control unit controlling the voltage generation unit to switch the applied voltages; and a detection unit detecting voltage of the first or second electrode or a rate of change in the voltage, wherein the control unit controls a target voltage of the voltage generation unit to be switched from a first voltage to a second voltage lower than the first voltage according to a detection output by the detection unit.

Another aspect of the present invention provides a method of controlling an electrostatic actuator having first and second electrodes formed so as to come close to each other when transition occurs from opened state to closed state by electrostatic attraction against elastic force, the method comprising: generating different applied voltages to be applied to the first and second electrodes; applying the applied voltages to the first and second electrodes; detecting voltage of the first or second electrode or a rate of change in the voltage; and controlling a target voltage to be switched from a first voltage to a second voltage lower than the first voltage according the detecting procedure.

Still another aspect of the present invention provides a method of controlling an electrostatic actuator having first and second electrodes formed so as to come close to each other when transition occurs from opened state to closed state by electrostatic attraction against elastic force, the method comprising: generating different applied voltages to be applied to the first and second electrodes; applying the applied voltages to the first and second electrodes; detecting voltage of the first or second electrode or a rate of change in the voltage; and controlling a target voltage to be switched from a first voltage to a second voltage lower than the first voltage when it is detected that a voltage rising rate of the first or second electrode becomes smaller than a predetermined rate.

BRIEF DESCRIPTION OF THE DRAWINGS

FIG. 1 is a diagram illustrating an entire structure of a semiconductor device according to a first embodiment;

FIG. 2 is a schematic diagram illustrating the electrostatic actuator 10;

DETAILED DESCRIPTION OF THE EMBODIMENTS

Figure 3:
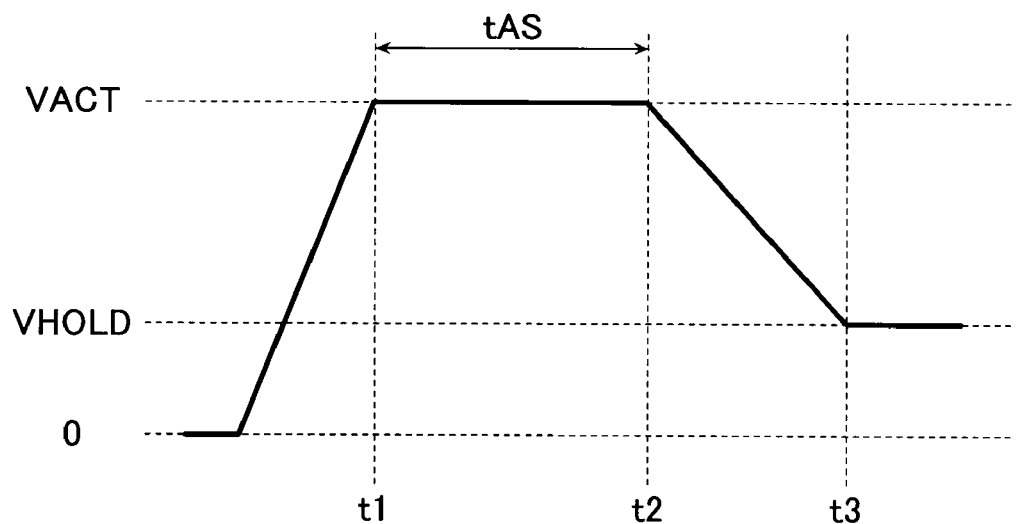
FIG. 3 is an example waveform diagram for explanation of problems in the waveform of the applied voltage according to a conventional theory.

Embodiments of the present invention will now be described in detail below with reference to the accompanying drawings.

First Embodiment

FIG. 1 is a schematic diagram illustrating an entire structure of a semiconductor device according to a first embodiment of the present invention.

The semiconductor device according to the first embodiment comprises, for example, an electrostatic actuator 10 with an electrostatic-type scheme as illustrated in FIG. 1, and an integrated circuit unit 20 for controlling the electrostatic actuator 10. The electrostatic actuator 10 has a well-known structure and the first embodiment is characterized by the operation of the integrated circuit unit 20. Note that the electrostatic actuator 10 and the integrated circuit unit 20 may be formed on one silicon substrate or a separate silicon substrate.

Referring first to FIG. 1, the structure of the electrostatic actuator 10 will be described below. FIG. 1A illustrates the electrostatic actuator 10 in its closed state (where the upper electrode 14 and the lower electrode 15 come in contact with each other via the insulation film 16), while FIG. 1B illustrates the electrostatic actuator 10 in its opened state (where the upper electrode 14 and the lower electrode 15 are separated from each other).

As illustrated in FIGS. 1A and 1B, the electrostatic actuator 10 comprises a beam part 11 fixed to a substrate (such as a silicon substrate), not illustrated, a movable part 12 movable with respect to the beam part 11, a fixed part 13 fixed to the beam part 11, an upper electrode 14 fixed to the movable part 12, a lower electrode 15 fixed to the fixed part 13, and an insulation film 16 formed on the surface of the lower electrode 15. The upper electrode 14 and the lower electrode 15 are supplied with a voltage (applied voltage) necessary for operation from the integrated circuit unit 20.

To switch the electrostatic actuator 10 so configured from its opened state to closed state, an operating voltage VACT which is an intended voltage (target voltage) is applied between the upper electrode 14 and the lower electrode 15 so that the electrostatic attraction between the electrodes 14 and 15 becomes greater than the elastic force of the movable part 12 to which the upper electrode 14 is fixed. When the electrostatic actuator 10 is in its closed state, the upper electrode 14 and the lower electrode 15 come in contact with each other via the insulation film 16, and, as illustrated in FIG. 2A, the capacitance Cmon=Cclose between the electrodes 14 and 15 becomes greater than the other capacitance Cmon=Copen in its opened state as illustrated in FIG. 2B.

In this electrostatic actuator 10 in its closed state, charges may be injected and trapped into the insulation film 16 (dielectric charging) by an FN tunnel or Poole-Frenkel mechanism. Then, when the amount of charges trapped into the insulation film 16 by dielectric charging becomes sufficiently large, the electrostatic actuator 10 cannot be switched from its closed state to opened state (stiction) since the upper electrode 14 is attracted by those charges within the insulation film 16 even if the potential difference between the upper electrode 14 and the lower electrode 15 is made to be equal to 0V.

When the electrostatic actuator 10 with such characteristics transitions from its opened state to closed state, the voltage (applied voltage) applied between the upper electrode 14 and the lower electrode 15 theoretically provides a waveform as, for example, illustrated in FIG. 3. Let us assume that one of the upper electrode 14 and the lower electrode 15 is grounded and the operating voltage VACT is applied to the other. When application of the operating voltage VACT is started from the opened state, the waveform of the applied voltage exhibits a sharp rise from 0V and then reaches the operating voltage VACT at time t1.

At this moment, after the electrostatic actuator 10 transitions to its closed state due to the continuous application of the operating voltage VACT during a certain application period tAS from time t1 to t2, for example, the electrostatic actuator 10 maintains its closed state at time t3 without returning to its opened state even if the applied voltage is reduced to a hold voltage VHOLD after time t2 that is slightly lower than the operating voltage VACT.

However, considering manufacturing variations of the electrostatic actuator 10, etc., the operating voltage VACT must have a high voltage value with some margin and the application period tAS must be extended to some extent. Therefore, excessively high voltage is applied to the electrostatic actuator 10 for an excessive period of time, which is not preferable in terms of reliability of the electrostatic actuator 10.

Figure 4:
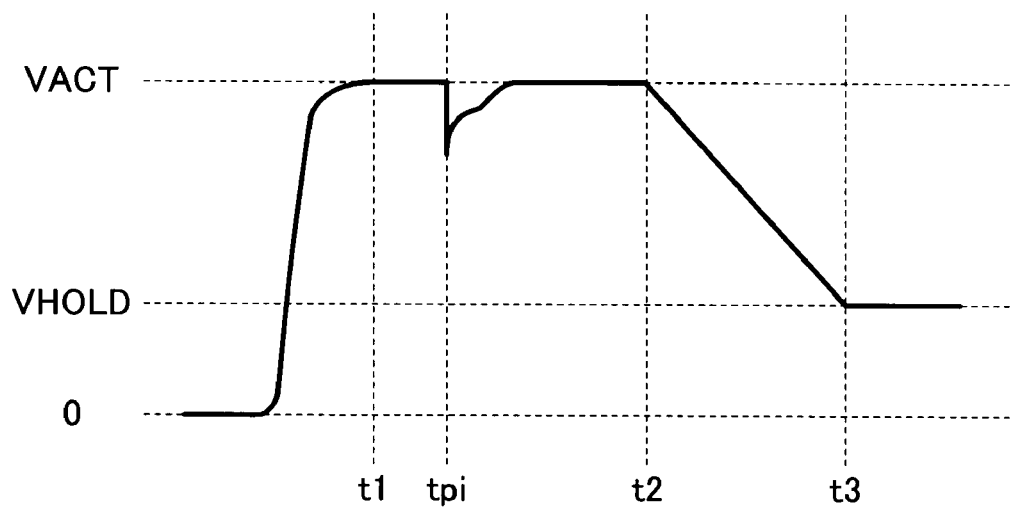
FIG. 4 is an example waveform diagram for explanation of actual problems in a conventional waveform of the applied voltage in a first embodiment.

An example waveform of voltage is illustrated in FIG. 4 that is actually applied to the upper electrode 14 when the electrostatic actuator 10 transitions from its opened state to closed state. Although the waveform of the applied voltage in this case reaches the operating voltage VACT at time t1 after application of the operating voltage VACT is started, the applied voltage falls from the operating voltage VACT at time tpi and again returns to the operating voltage VACT by time t2.

The applied voltage falls at time tpi because the electrostatic actuator 10 has a large (increased) capacitance as the electrostatic actuator 10 transitions from its opened state to closed state and the corresponding power supply circuit, etc., applying voltage has finite output resistance. However, such continuous application of the operating voltage VACT from time tpi to t2 regardless of the electrostatic actuator 10 actually being in its closed state means a continuous increase in the power consumption.

Accordingly, in the semiconductor device according to the first embodiment, it is detected by a control circuit of the integrated circuit unit 20 described below that the capacitance of the electrostatic actuator 10 increases and the applied operating voltage VACT temporarily falls as the electrostatic actuator 10 transitions from its opened state to closed state. Then, upon detection of a temporary fall in the operating voltage VACT, the applied voltage is switched to the hold voltage VHOLD, achieving increased operating speed while reducing the power consumption. In this way, improved reliability of the electrostatic actuator 10 is achieved.

Figure 5:
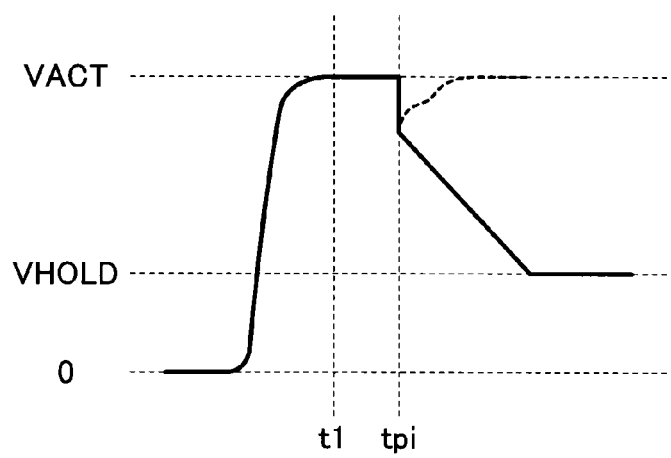
FIG. 5 is an example waveform diagram illustrating the waveform of the applied voltage to the electrostatic actuator 10 in the first embodiment.

Through this control, the applied voltage to the electrostatic actuator 10 exhibits a waveform as, for example, illustrated in FIG. 5. Firstly, the applied voltage is caused to rise from 0 V to the operating voltage VACT around time t1 for the electrostatic actuator 10 in its opened state. Then, after the applied voltage that has been applied to the upper electrode 14 reaches the operating voltage VACT, the electrostatic actuator 10 transitions at certain time tpi from its opened state to closed state and its capacitance increases accordingly. As a result, a temporary fall from the operating voltage VACT occurs in the applied voltage.

Since the electrostatic actuator 10 is already in its closed state at this moment, the applied voltage is directly switched to the hold voltage VHOLD (as indicated by the full line) without applying the operating voltage VACT to the upper electrode 14 after time tpi as indicated by the dotted line in FIG. 5. Thus, the time for applying the operating voltage VACT can be reduced as compared with the case of FIG. 4, thereby effectively reducing the power consumption.

Figure 6A:
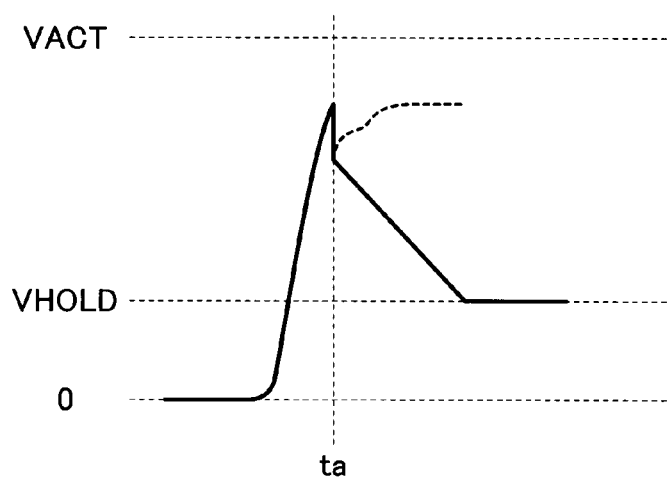
FIG. 6A is another example waveform diagram illustrating the waveform of the applied voltage to the electrostatic actuator 10 in the first embodiment.

In addition, the voltage applied to the electrostatic actuator 10 exhibits a waveform as illustrated in FIG. 6A, for example, when a transition to the closed state occurs before the voltage reaches the operating voltage VACT. Firstly, when the applied voltage to the electrostatic actuator 10 in its opened state is caused to rise from 0 V to the operating voltage VACT, the electrostatic actuator 10 transitions from its opened state to closed state at time ta preceding time t1 and its capacitance increases accordingly. As a result, the applied voltage to the upper electrode 14 temporarily falls before reaching the operating voltage VACT.

Since the electrostatic actuator 10 is already in its closed state at this moment, the applied voltage is directly switched to the hold voltage VHOLD without applying the operating voltage VACT as the applied voltage after time ta as indicated by the dotted line in FIG. 6A. Thus, the time for applying voltage can be reduced as compared with the case of FIG. 4, thereby effectively reducing the power consumption.

Through this control, in the semiconductor device according to the first embodiment, the electrostatic actuator 10 can be switched to its closed state by applying only a minimum voltage necessary for the electrostatic actuator 10 to transition from its opened state to closed state for a minimum period of time, which may achieve reduced power consumption and improved reliability.

Figure 6B:
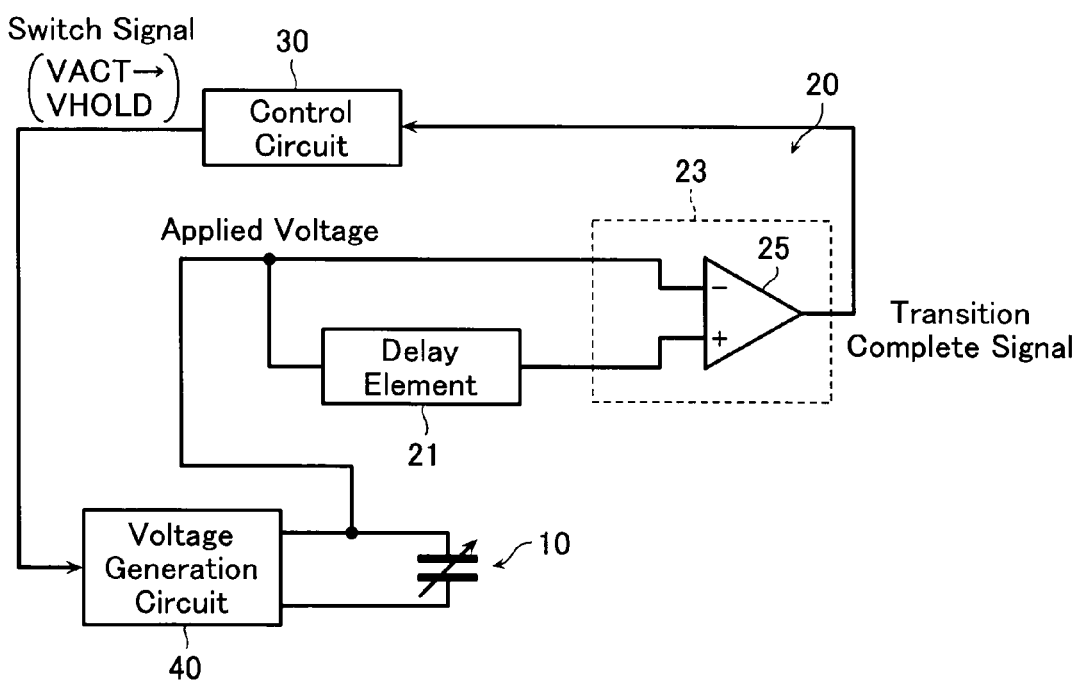
FIG. 6B is a diagram illustrating an example configuration of the integrated circuit unit 20 in the semiconductor device according to the first embodiment.

FIG. 6B illustrates an example configuration of the integrated circuit unit 20 in the semiconductor device according to the first embodiment. The integrated circuit unit 20 comprises a delay element 21, a comparator 25 that configures a detection unit 23, a control circuit 30, and a voltage generation circuit 40. The voltage generation circuit 40 generates an operating voltage VACT and a hold voltage VHOLD as the applied voltage to the electrostatic actuator 10.

The applied voltage from the voltage generation circuit 40 is connected to the minus-side input terminal of the comparator 25 in the detection unit 23 as well as to the plus-side input terminal thereof via the delay element 21. Thereafter, it is subject to comparison by the comparator 25. If the voltage falls that is applied to the electrostatic actuator 10 by the voltage generation circuit 40, then the comparator 25 provides a positive output, which is then recognized by the control circuit 30 as a transition complete signal. Then, the control circuit 30 outputs a switch signal to the voltage generation circuit 40 that causes the applied voltage to be switched from the operating voltage VACT to the hold voltage VHOLD.

Figure 6C:
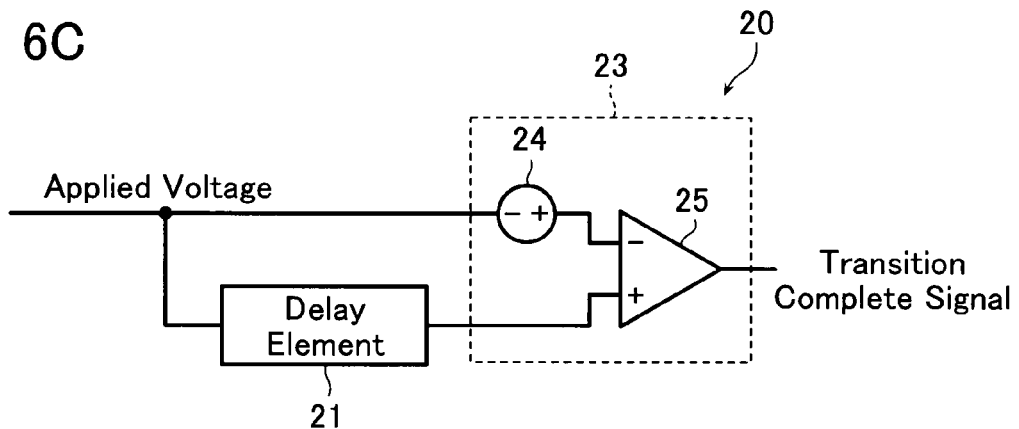
FIG. 6C is a diagram illustrating another example configuration of a part of the integrated circuit unit 20 in the semiconductor device according to the first embodiment.
Figure 6D:
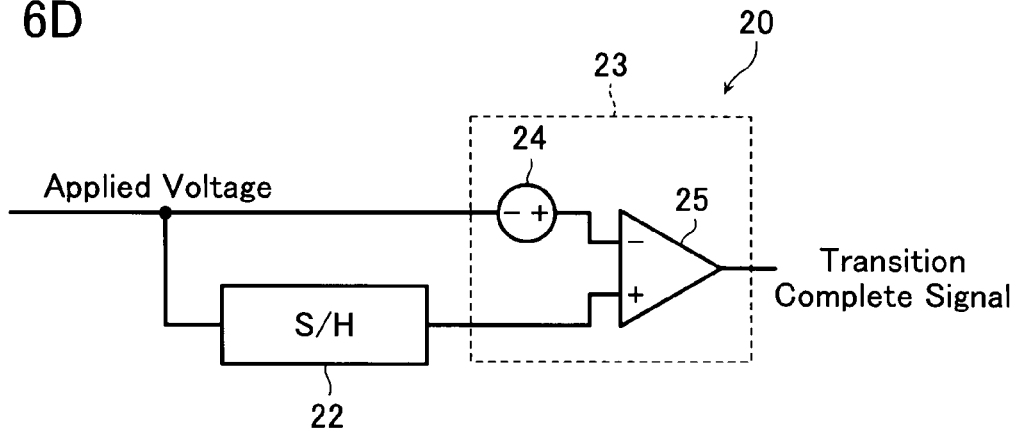
FIG. 6D is a diagram illustrating still another example configuration of a part of the integrated circuit unit 20 in the semiconductor device according to the first embodiment.

FIG. 6C illustrates another example configuration of a part of the integrated circuit unit 20 in the semiconductor device according to the first embodiment. In addition, FIG. 6D illustrates still another example configuration of a part of the integrated circuit unit 20 in the semiconductor device according to the first embodiment. Note that herein after the same reference numerals represent the same components as described above and description thereof will be omitted, unless otherwise indicated herein. The integrated circuit unit 20 illustrated in FIGS. 6C and 6D takes into account a fall in the applied voltage for a short period of time if the electrostatic actuator 10 would not transition to its closed state due to noise or the like.

Specifically, the integrated circuit unit 20 is different from the aforementioned case in that an offset voltage 24 is added to the applied voltage from the voltage generation circuit 40, the resulting voltage is connected to the minus-side input terminal of the comparator 25 in the detection unit 23, and the applied voltage from the voltage generation circuit 40 is connected to the plus-side input terminal thereof via the delay element 21.

In addition, as illustrated in FIG. 6D, the integrated circuit unit 20 may be configured in such a way that the applied voltage from the voltage generation circuit 40 with an additional offset voltage 24 is connected to the minus-side input terminal of the comparator 25 in the detection unit 23, and the applied voltage from the voltage generation circuit 40 is connected to the plus-side input terminal thereof via a sample-hold circuit 22.

Figure 6E:
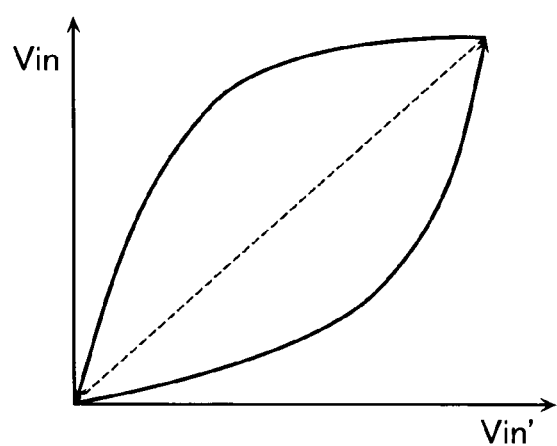
FIG. 6E is a diagram illustrating an example of an input voltage and a comparison voltage applied to the comparator 25 with hysteresis according to the first embodiment.

As can be seen from the above, with the configuration of the comparator 25 in the detection unit 23 having an offset voltage 24, such effects due to noise or the like may be kept as small as possible. As illustrated in FIG. 6E, it should be noted that a comparator with hysteresis as illustrated a solid line an input voltage Vin' and a comparison voltage Vin is in a non-linear relationship may be used instead of adding the above-mentioned offset voltage 24 to the applied voltage, or combination thereof may be preferably used as a countermeasure against the noise, etc.

Second Embodiment

Figure 7:
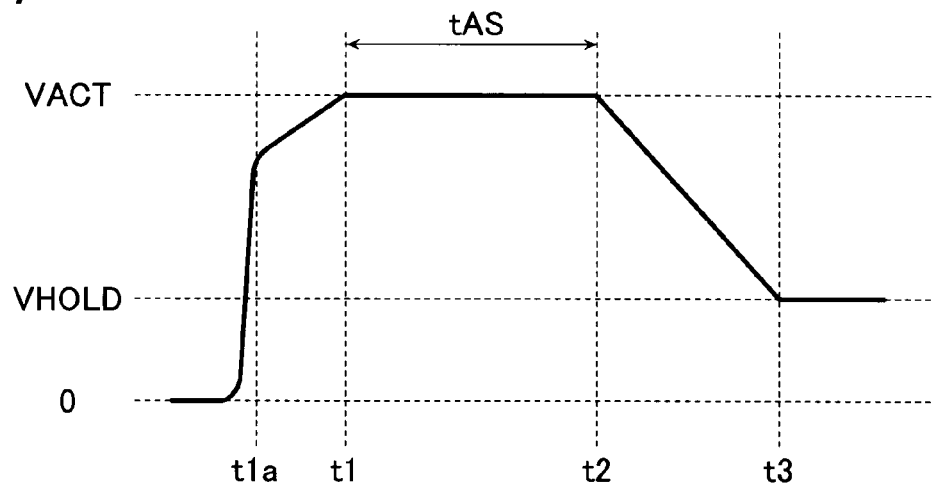
FIG. 7 is an example waveform diagram for explanation of actual problems in a conventional waveform of the applied voltage in a second embodiment.

While the semiconductor device according to the first embodiment of the present invention is characterized in that the applied voltage to the electrostatic actuator 10 is switched when a temporary fall in the applied voltage is detected, the semiconductor device according to the second embodiment has the following characteristics: The semiconductor device according to the second embodiment switches the applied voltage to the electrostatic actuator 10 when a change in the rising rate of the applied voltage is detected. For example, regarding the electrostatic actuator 10 of the type where the upper electrode 14 and the lower electrode 15 are relatively slowly opened and closed, it will take more than a certain amount of time for the electrodes 14 and 15 to transition from their opened states to closed states. Then, the voltage applied to the upper electrode 14 exhibits a waveform as, for example, illustrated in FIG. 7. That is, when application of the operating voltage VACT is started from the opened state, the waveform of the applied voltage exhibits a sharp rise from 0V and then a moderate rise at time t1a, after which the applied voltage reaches the operating voltage VACT at time t1 while keeping that moderate rising rate.

Then, unlike the case illustrated in FIG. 4, the electrostatic actuator 10 transitions to its closed state, while the applied voltage does not exhibit any fall from the operating voltage VACT throughout a certain application period tAS from time t1 to t2. Further, for example, the electrostatic actuator 10 still maintains its closed state without returning to its opened state even if the applied voltage is allowed to fall to the hold voltage VHOLD after time t2 and time t3 is reached thereafter. In this case, the electrostatic actuator 10 transitions to its closed state and its capacitance increases at a time preceding time t1 when the applied voltage exhibits a moderate rise (time t1a, see FIG. 7).

Figure 8A:
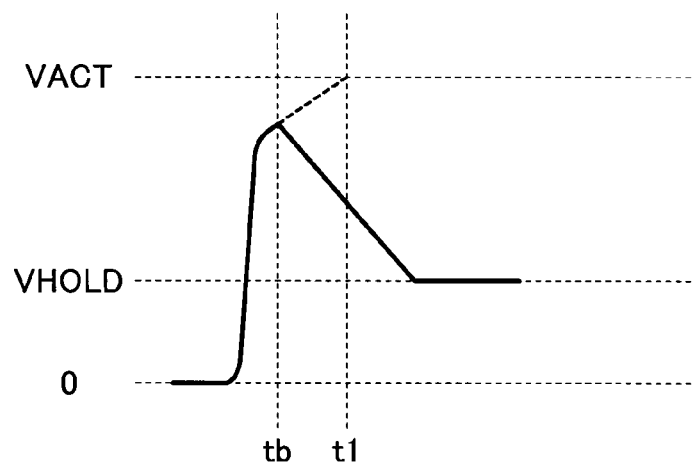
FIG. 8A is an example waveform diagram illustrating the waveform of the applied voltage to the electrostatic actuator 10 in the second embodiment.

Accordingly, in the semiconductor device according to the second embodiment, as illustrated in FIG. 8A, the applied voltage is switched from the operating voltage VACT to the hold voltage VHOLD at time tb immediately after time t1a when the moderate rise is exhibited, thereby reducing the power consumption and providing improved reliability of the electrostatic actuator 10.

FIG. 5B illustrates an example configuration of the integrated circuit unit 20 in the semiconductor device according to the second embodiment. In the integrated circuit unit 20, the applied voltage from the voltage generation circuit 40 is connected to the minus-side input terminal of the comparator 25 in the detection unit 23 as well as to the plus-side input terminal thereof via the delay element 21 and the offset voltage 24. Thereafter, it is subject to comparison by the comparator 25.

The comparator 25 may determine the timing when a moderate rise is found in the voltage generated and applied to the electrostatic actuator 10 by the voltage generation circuit 40. Accordingly, that timing may be recognized by the control circuit 30 as a transition complete signal and a switch signal may be output to the voltage generation circuit 40 to switch the applied voltage from the operating voltage VACT to the hold voltage VHOLD. With this configuration, a desired voltage rising rate can be detected with reference to the delay time in the delay element 21 and the offset time in the offset voltage 24.

Figure 8B:
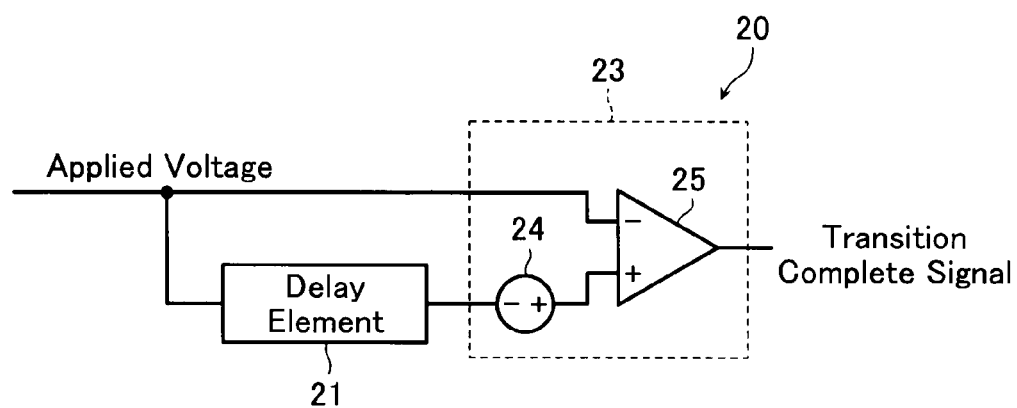
FIG. 8B is a diagram illustrating an example configuration of the integrated circuit unit 20 in the semiconductor device according to the second embodiment.
Figure 8C:
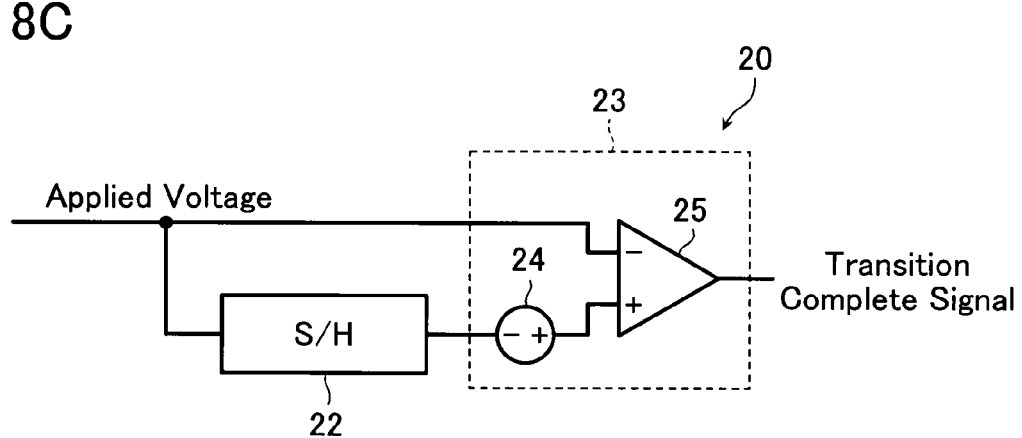
FIG. 8C is a diagram illustrating another example configuration of a part of the integrated circuit unit 20 in the semiconductor device according to the second embodiment.
Figure 8D:
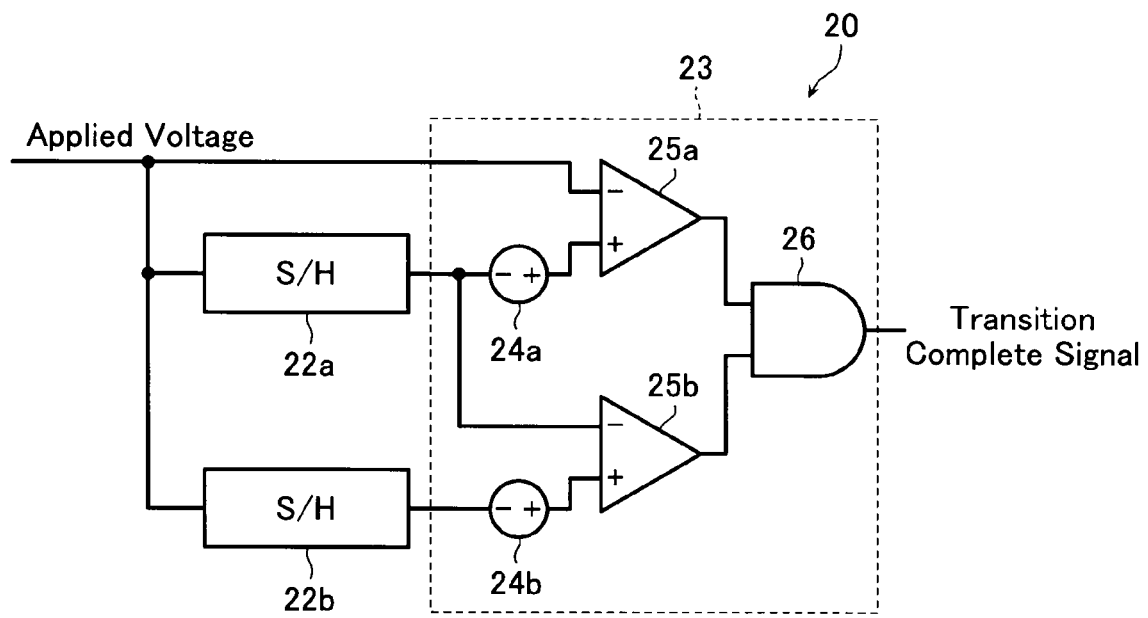
FIG. 8D is a diagram illustrating still another example configuration of a part of the integrated circuit unit 20 in the semiconductor device according to the second embodiment.

FIG. 8C illustrates another example configuration of a part of the integrated circuit unit 20 in the semiconductor device according to the second embodiment. In addition, FIG. 8D illustrates still another example configuration of a part of the integrated circuit unit 20 in the semiconductor device according to the second embodiment. As illustrated in FIG. 8C, the integrated circuit unit 20 has a configuration where the delay element 21 in the case of FIG. 5B is replaced with the sample-hold circuit 22.

On the other hand, the integrated circuit unit 20 illustrated in FIG. 8D takes into account a possible moderate rise in the applied voltage for a short period of time due to noise or the like. For example, a sample-hold circuit 22a which is sampled at an earlier sampling time and another sample-hold circuit 22b which is sampled later than the sample-hold circuit 22a are used in the integrated circuit unit 20, while offset voltages 24a, 24b, comparators 25a, 25b, and an AND gate 26 are employed in the detection unit 23.

Then, an AND signal is output from the AND gate 26 regarding: (1) the result of the comparison performed by the comparator 25a between the output of the sample-hold circuit 22a with the additional offset voltage 24a and the applied voltage, and (2) the result of the comparison performed by the comparator 25b between the output of the sample-hold circuit 22a and the output of the sample-hold circuit 22b with the additional offset voltage 24b. Based on this AND signal, the timing is detected when the electrostatic actuator 10 transitions to its closed state.

Once the control circuit 30 recognizes the transition complete signal from the AND gate 26 at that timing, such effects due to noise or the like may be kept as small as possible. As with the first embodiment, it should be noted that the comparators 25, 25a, and 25b may have hysteresis or such comparators may be combined with the offset voltages 24, 24a, 24b as a countermeasure against the noise, etc.

Third Embodiment

Figure 9A:
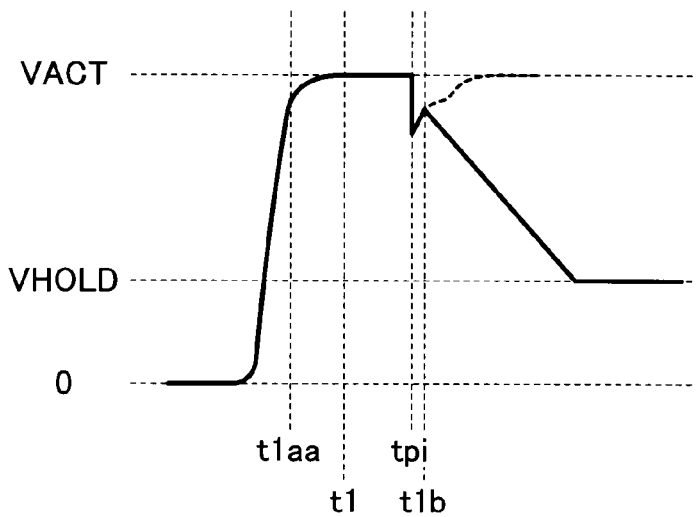
FIG. 9A is an example waveform diagram illustrating the waveform of the applied voltage to the electrostatic actuator 10 in a third embodiment.

While the semiconductor device according to the second embodiment of the present invention is characterized in that the applied voltage to the electrostatic actuator 10 is switched by detecting a change in rising rate of the applied voltage, a semiconductor device according to a third embodiment has the following characteristics: That is, the semiconductor device according to the third embodiment detects a temporary fall in the applied voltage to the electrostatic actuator 10 and a change in rising rate of the applied voltage to switch the applied voltage. For example, if the applied voltage to the electrostatic actuator 10 is susceptible to change (unstable state), the voltage being applied to the electrostatic actuator 10 exhibits a waveform such that once falls after reaching the operating voltage VACT and then moderately rises again, which is illustrated in FIG. 9A, for example. That is, when application of the operating voltage VACT is started from the opened state, the waveform of the applied voltage to the upper electrode 14 exhibits a sharp rise from 0V and then a moderate rise at time t1aa, after which the applied voltage reaches the operating voltage VACT at time t1 with a further moderate rising rate.

Then, the electrostatic actuator 10 transitions from its opened state to closed state at certain time tpi after time t1 and its capacitance increases accordingly. As a result, a temporary fall from the operating voltage VACT occurs in the applied voltage. However, since the operating voltage VACT is continually applied to the electrostatic actuator 10, the applied voltage moderately rises again after time tpi. Since the electrostatic actuator 10 is already in its closed state at this moment, the applied voltage is directly switched to the hold voltage VHOLD without applying the operating voltage VACT as the applied voltage after time t1b immediately after time tpi as indicated by the dotted line in FIG. 9A.

Accordingly, for example, if the voltage applied to the electrostatic actuator 10 is in unstable state as being generated by a boost circuit and due to fluctuation effects, etc., or if a ripple occurs in the applied voltage, such fluctuation or ripple effects in the applied voltage cannot be recognized as transition to the closed state. Thus, the timing when the electrostatic actuator 10 actually transitions to its closed state can be recognized accurately, which allows the applied voltage to be switched from the operating voltage VACT to the hold voltage VHOLD.

Figure 9B:
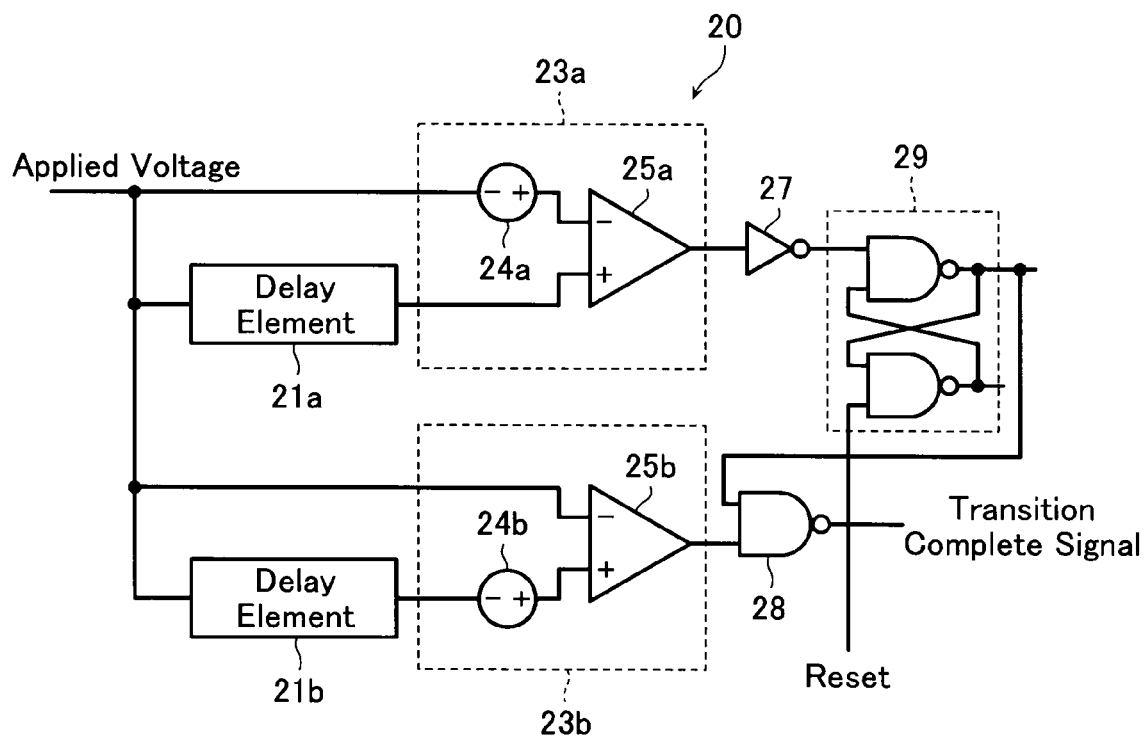
FIG. 9B is a diagram illustrating an example configuration of the integrated circuit unit 20 in the semiconductor device according to the third embodiment.

FIG. 9B illustrates an example configuration of the integrated circuit unit 20 in the semiconductor device according to the third embodiment. For example, the integrated circuit unit 20 may have the configuration illustrated in FIG. 5C regarding the first embodiment to detect that the applied voltage once falls, and it may have the configuration illustrated in FIG. 8B regarding the second embodiment to detect that the applied voltage exhibits a moderate rising rate.

Specifically, in the integrated circuit unit 20, the applied voltage with an additional offset voltage 24a is connected to the minus-side input terminal of the comparator 25a in a detection unit 23a, and the applied voltage through a delay element 21a is connected to the plus-side input terminal of the comparator 25a. Then, an output of the comparator 25a is latched at an RS flip-flop (herein after, abbreviated as "RS-FF") 29 via the inverter 27.

On the other hand, the applied voltage is connected to the minus-side input terminal of the comparator 25b in a detection unit 23b, and the applied voltage with an offset voltage 24b that is added through a delay element 21b is connected to the plus-side input terminal of the comparator 25b. The output of the comparator 25b and the latched data in the RS-FF 29 are input to a NAND gate 28. Wherein, the latched data in the RS-FF 29 represents a signal indicating a fall in the applied voltage and the output of the comparator 25b represents a signal indicating whether the applied voltage exhibits a moderate rising rate. Accordingly, by inputting the output of the comparator 25b and the latched data in the RS-FF 29 to the NAND gate 28, a transition complete signal may be obtained indicating whether the applied voltage moderately rises again after falling. Based on the obtained transition complete signal, the applied voltage of the voltage generation circuit 40 may be switched by the control circuit 30.

Fourth Embodiment

Figure 10:
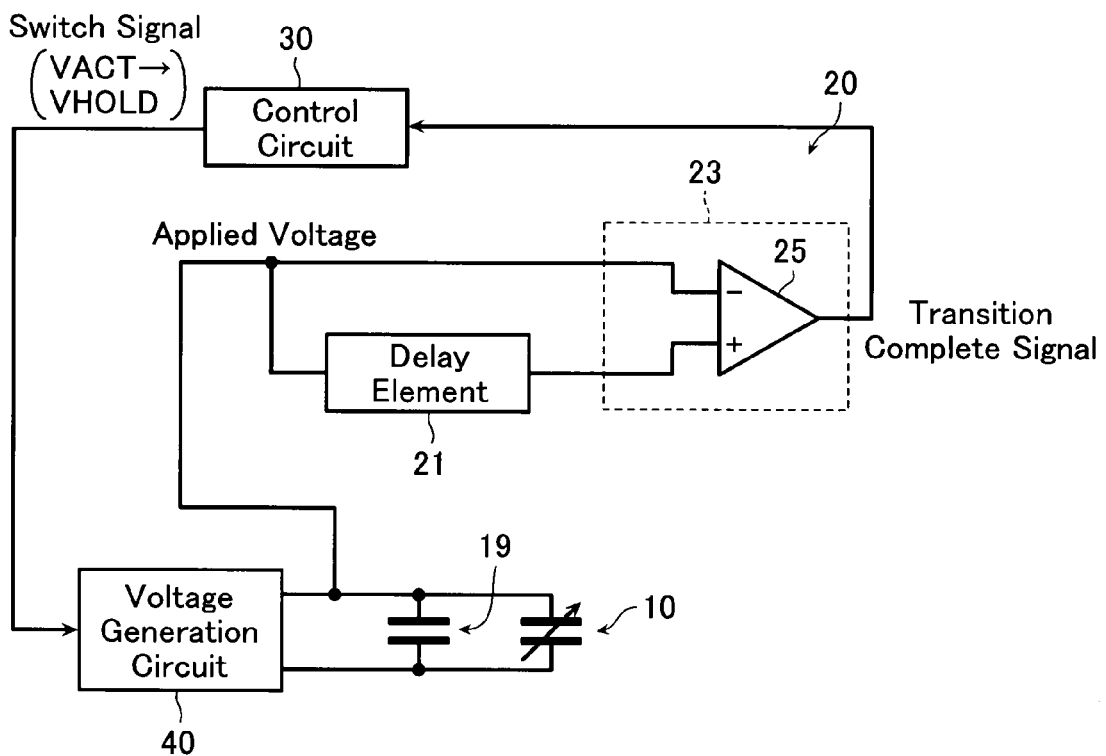
FIG. 10 is a diagram illustrating an example configuration of the integrated circuit unit 20 in a semiconductor device according to a fourth embodiment.

A semiconductor device according to a fourth embodiment of the present invention will now be described below. FIG. 10 illustrates an example configuration of the integrated circuit unit 20 in the semiconductor device according to the fourth embodiment. The integrated circuit unit 20 in the semiconductor device according to the fourth embodiment is different than the configuration illustrated in FIG. 6B regarding the first embodiment in that it has an additional capacitor 19, which is arranged to be connected in parallel to the upper electrode 14 and the lower electrode 15 of the electrostatic actuator 10.

As can be seen from the above, the capacitor 19 is connected in parallel between the voltage generation circuit 40 and the electrostatic actuator 10. The capacitor 19 has a capacitance of, for example, less than twenty times the capacitance difference between opened state and closed state of the electrostatic actuator 10. Setting such capacitance enables the magnitude of voltage drop in the applied voltage to be kept as small as on the order of 5% of the actually-applied voltage when the electrostatic actuator 10 transitions to its closed state. It also enables the rising rate of the applied voltage to be on the order of 5% slower than otherwise after transition to the closed state.

Through this configuration of the integrated circuit unit 20, it is possible to mitigate the impact on the voltage applied to the upper electrode 14 when the electrostatic actuator 10 transitions to its closed state by means of the capacitance of the capacitor 19, as well as to prevent situations where the states associated with switching the applied voltage cannot be detected. Note that since capacitor 19 that is connected when the hold voltage VHOLD is applied by the voltage generation circuit 40 does not affect the electrostatic actuator 10 for reduction in its power consumption or improvement in its operating speed, it is not necessarily set to be less than twenty times the above-mentioned capacitance difference because.

Fifth Embodiment

Figure 11:
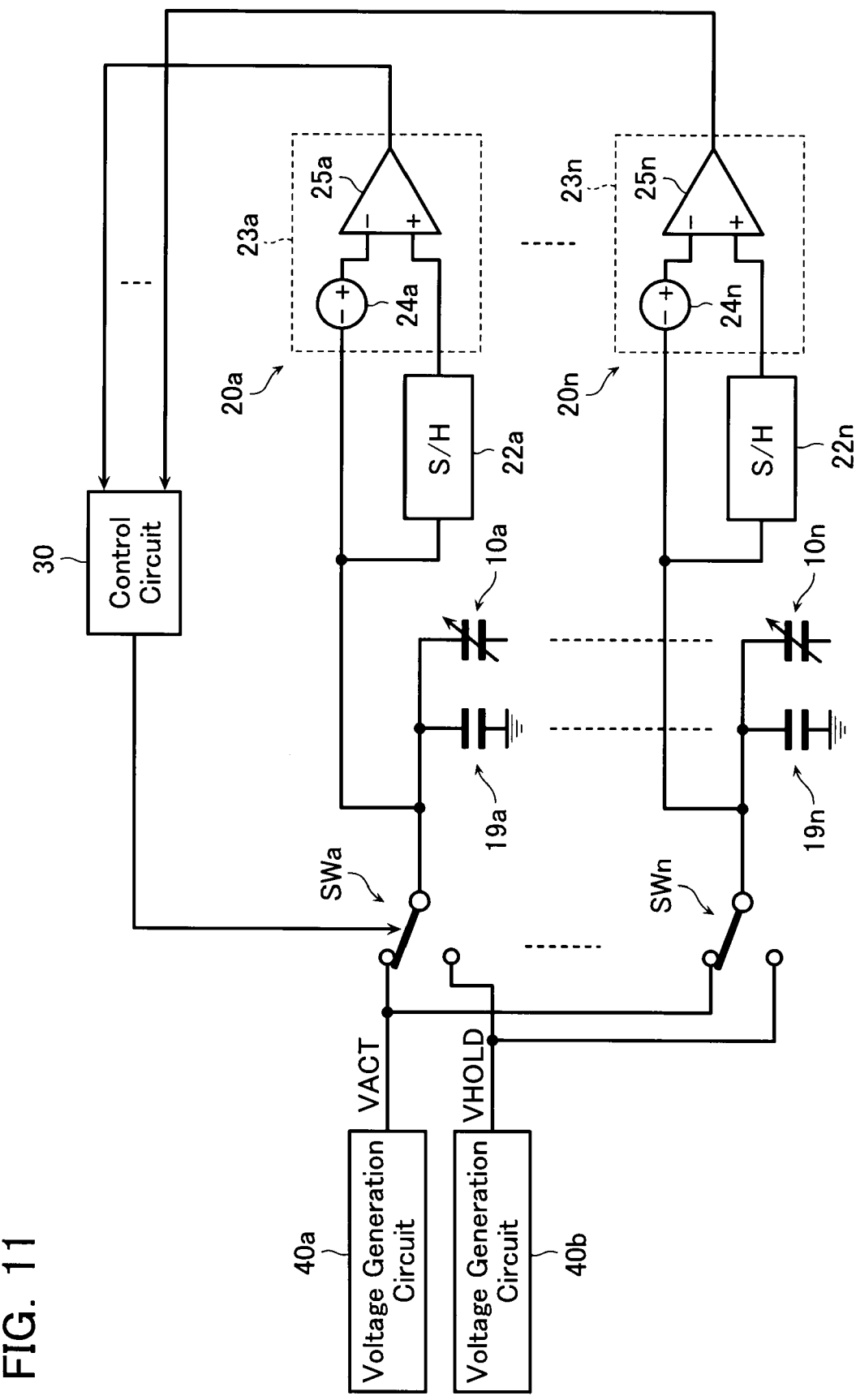
FIG. 11 is a diagram illustrating an example circuit configuration of a semiconductor device according to a fifth embodiment.

A semiconductor device according to a fifth embodiment of the present invention will now be described below. FIG. 11 illustrates an example circuit configuration of the semiconductor device according to the fifth embodiment. The semiconductor device according to the fifth embodiment comprises a plurality of electrostatic actuators 10a-10n (hereinafter, "n" is any natural number) and capacitors 19a-19n, one voltage generation circuit 40a including a boost circuit for outputting an operating voltage VACT, and the other voltage generation circuit 40b including a boost circuit for outputting a hold voltage VHOLD.

The electrostatic actuators 10a-10n and the capacitors 19a-19n are connected to respective voltage generation circuits 40a, 40b via respective switches SWa-SWn. A plurality of detection circuits 20a-20n that detect transition of the electrostatic actuators 10a-10n to their closed states include sample-hold circuits 22a-22n, offset voltages 24a-24n, and comparators 25a-25n, as illustrated in FIG. 6D regarding the first embodiment. The offset voltages 24a-24n and the comparators 25a-25n configure respective detection units 23a-23n.

In the semiconductor device so configured, a transition complete signal is input to the control circuit 30 from one of the detection units 23a-23n in the detection circuits 20a-20n. Then, the control circuit 30 switches a corresponding switch SWa-SWn to control the operating voltage VACT to be switched to the hold voltage VHOLD at the timing when each of the electrostatic actuators 10a-10n transitions to its closed state.

This enables the applied voltage (the operating voltage VACT) to the electrostatic actuators 10a-10n and its application time to be minimized, which may achieve reduced power consumption and improved reliability.

Sixth Embodiment

Figure 12:
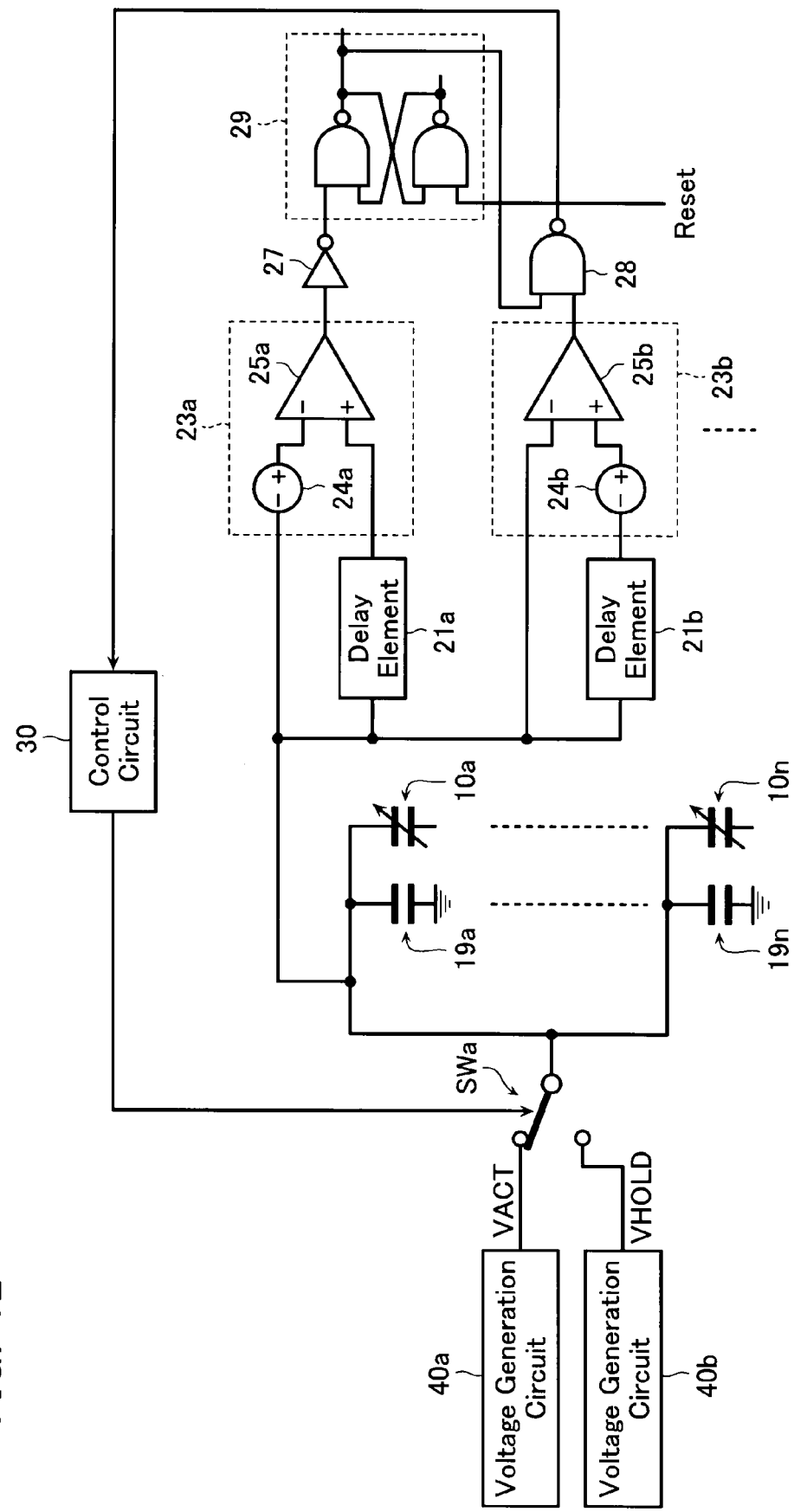
FIG. 12 is a diagram illustrating an example circuit configuration of a semiconductor device according to a sixth embodiment.

A semiconductor device according to a sixth embodiment of the present invention will now be described below. FIG. 12 illustrates an example circuit configuration of the semiconductor device according to the sixth embodiment. The semiconductor device according to the sixth embodiment is the same as the semiconductor device according to the fifth embodiment in that it comprises a plurality of electrostatic actuators 10a-10n and capacitors 19a-19n, one voltage generation circuit 40a including a boost circuit for outputting an operating voltage VACT, the other voltage generation circuit 40b including a boost circuit for outputting a hold voltage VHOLD. However, it is different than the semiconductor device according to the fifth embodiment in that the electrostatic actuators 10a-10n and the capacitors 19a-19n are each connected to the voltage generation circuits 40a and 40b via a single switch SWa.

With this configuration, it is possible to reduce the number and area of switches in one integrated circuit unit 20 and the size of the device as compared with the configuration of the fifth embodiment. Note that each of the integrated circuit units 20 that detects transition of the electrostatic actuators 10a-10n to their closed states includes, as illustrated in FIG. 9B regarding the third embodiment, the delay elements 21a, 21b, the offset voltages 24a, 24b, the comparators 25a, 25b, an inverter 27, a NAND gate 28, and the RS-FF 29, and the offset voltages 24a, 24b and the comparators 25a, 25b configure respective detection units 23a, 23b.

In the semiconductor device so configured, the switch SWa may be connected to the voltage generation circuit 40a to apply the operating voltage VACT to the respective electrostatic actuators 10a-10n. In addition, when the transition complete signals from the respective NAND gates 28 indicate that all of the electrostatic actuators 10a-10n have transitioned to their closed states, the switch SWa may be switched to the voltage generation circuit 40b by the control circuit 30 to apply the hold voltage VHOLD to the respective electrostatic actuators 10a-10n.

Besides, in this case, each capacitance of the capacitors 19a-19n connected to the voltage generation circuit 40a that generates the operating voltage VACT may be set less than twenty times the capacitance difference between opened states and closed states of the electrostatic actuators 10a-10n, as described above.

While embodiments of the present invention have been described, the present invention is not intended to be limited to the disclosed embodiments and various other changes, additions or the like may be made thereto without departing from the spirit of the invention.

What is claimed is:

1. A semiconductor device controlling an electrostatic actuator having first and second electrodes formed so as to come close to each other when transition occurs from opened state to closed state by electrostatic attraction against elastic force,
the semiconductor device comprising:
a voltage generation unit generating different applied voltages to be applied to the first and second electrodes;
a control unit controlling the voltage generation unit to switch the applied voltages; and
a detection unit detecting voltage of the first or second electrode or a rate of change in the voltage,
wherein the control unit controls a target voltage of the voltage generation unit to be switched from a first voltage to a second voltage lower than the first voltage according to a detection output by the detection unit,
wherein the detection unit comprises a comparator, and the applied voltages from the voltage generation unit are input to a first input terminal of the comparator with an additional predetermined offset voltage and to a second input terminal of the comparator via a delay element.

2. A semiconductor device controlling an electrostatic actuator having first and second electrodes formed so as to come close to each other when transition occurs from opened state to closed state by electrostatic attraction against elastic force,
the semiconductor device comprising:
a voltage generation unit generating different applied voltages to be applied to the first and second electrodes;
a control unit controlling the voltage generation unit to switch the applied voltages; and
a detection unit detecting voltage of the first or second electrode or a rate of change in the voltage,
wherein the control unit controls a target voltage of the voltage generation unit to be switched from a first voltage to a second voltage lower than the first voltage according to a detection output by the detection unit,
wherein the detection unit comprises a comparator, and
the applied voltages from the voltage generation unit are input to a first input terminal of the comparator with an additional predetermined offset voltage and to a second input terminal of the comparator via a sample-hold circuit.

3. The semiconductor device according to claim 1, further comprising: a smoothing capacity element arranged to be connected in parallel to the first and second electrodes.

4. The semiconductor device according to claim 3, wherein the smoothing capacity element is set to have a capacitance of less than twenty times a capacitance difference between opened state and closed state of the electrostatic actuator.

5. The semiconductor device according to claim 1, wherein the detection unit comprises a comparator with hysteresis.

6. The semiconductor device according to claim 2, further comprising: a smoothing capacity element arranged to be connected in parallel to the first and second electrodes.

7. The semiconductor device according to claim 6, wherein the smoothing capacity element is set to have a capacitance of less than twenty times a capacitance difference between opened state and closed state of the electrostatic actuator.

8. The semiconductor device according to claim 2, wherein the detection unit comprises a comparator with hysteresis.

* * * * *